US010540007B2

United States Patent
Tiana et al.

(10) Patent No.: US 10,540,007 B2
(45) Date of Patent: Jan. 21, 2020

(54) SYSTEMS AND METHODS FOR DELIVERING IMAGERY TO HEAD-WORN DISPLAY SYSTEMS

(71) Applicant: Rockwell Collins, Inc., Cedar Rapids, IA (US)

(72) Inventors: Carlo L. Tiana, Portland, OR (US); Weston J. Lahr, Sherwood, OR (US); Robert B. Wood, Beaverton, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 98 days.

(21) Appl. No.: 15/061,922

(22) Filed: Mar. 4, 2016

(65) Prior Publication Data

US 2017/0255257 A1 Sep. 7, 2017

(51) Int. Cl.
*G06F 3/01* (2006.01)
*G02B 27/01* (2006.01)
(Continued)

(52) U.S. Cl.
CPC .............. *G06F 3/013* (2013.01); *G06F 3/012* (2013.01); *G06F 3/14* (2013.01);
(Continued)

(58) Field of Classification Search
CPC . G06F 3/14; G06F 3/012; G06F 3/013; G06F 3/04847; G09G 5/377; G09G 5/391;
(Continued)

(56) References Cited

U.S. PATENT DOCUMENTS 4,028,725 A * 6/1977 Lewis ..................... G01S 5/163
   235/411
5,072,218 A * 12/1991 Spero ................... G02B 27/017
   340/980

(Continued)

FOREIGN PATENT DOCUMENTS

| CN | 103209895 A | 7/2013 |
|---|---|---|
| CN | 103930817 A | 7/2014 |
| CN | 105340279 A | 2/2016 |

OTHER PUBLICATIONS

Second Office Action for Chinese Application No. 201610997936.5 dated Sep. 3, 2019. 34 pages.

*Primary Examiner* — Bryan Earles
(74) *Attorney, Agent, or Firm* — Donna P. Suchy; Daniel M. Barbieri

(57) ABSTRACT

A method for providing a display on a head-worn display includes receiving imagery from one or more sensors configured to capture details of an environment surrounding an aircraft, receiving a current gaze of a user of the head-worn display, and processing the imagery. Processing the imagery comprises identifying one or more attributes of the imagery. The method further includes identifying at least two layers of the imagery. At least one of the at least two layers has a different resolution than another layer. The method further includes determining a priority of each of the at least two layers based on the one or more attributes and the current gaze of the user. The method further includes transmitting one or more of the at least two layers to the head-worn display based on the determined priority of the layers.

18 Claims, 2 Drawing Sheets

(51) Int. Cl.
  *G09G 5/391* (2006.01)
  *G06F 3/14* (2006.01)
  *G09G 5/377* (2006.01)
  *G06F 3/0484* (2013.01)

(52) U.S. Cl.
  CPC ............... *G02B 2027/014* (2013.01); *G02B 2027/0138* (2013.01); *G02B 2027/0147* (2013.01); *G02B 2027/0187* (2013.01); *G09G 5/377* (2013.01); *G09G 5/391* (2013.01); *G09G 2340/0407* (2013.01); *G09G 2340/12* (2013.01); *G09G 2380/12* (2013.01)

(58) Field of Classification Search
  CPC ....... G09G 2340/0407; G09G 2340/12; G09G 2380/12; G02B 27/0179; G02B 27/0172; G02B 2027/0147; G02B 2027/0138; G02B 2027/014; G02B 2027/0187
  See application file for complete search history.

(56) References Cited

U.S. PATENT DOCUMENTS

| | | | |
|---|---|---|---|
| 6,101,431 A * | 8/2000 | Niwa | G01C 11/00 340/980 |
| 7,508,988 B2 * | 3/2009 | Hara | H04N 19/647 382/232 |
| 8,184,069 B1 * | 5/2012 | Rhodes | G02B 27/017 345/8 |
| 8,724,914 B2 * | 5/2014 | Inada | G06T 11/00 382/173 |
| 9,096,354 B2 * | 8/2015 | Baudson | B65D 45/00 |
| 9,347,792 B2 * | 5/2016 | Meeker | G01C 21/3638 |
| 9,740,012 B2 * | 8/2017 | Border | G02B 27/0172 |
| 2005/0007386 A1 * | 1/2005 | Berson | G01C 23/00 345/633 |
| 2009/0303082 A1 * | 12/2009 | Larson | G01C 23/005 340/945 |
| 2010/0097241 A1 * | 4/2010 | Suddreth | G01C 23/00 340/972 |
| 2010/0238161 A1 * | 9/2010 | Varga | G06T 17/05 345/419 |
| 2010/0250030 A1 | 9/2010 | Nichols et al. | |
| 2011/0106447 A1 * | 5/2011 | Wise | G01S 7/22 701/431 |
| 2011/0187563 A1 * | 8/2011 | Sanders-Reed | G06F 3/14 340/971 |
| 2012/0314032 A1 * | 12/2012 | Muensterer | G01C 23/005 348/46 |
| 2014/0184475 A1 * | 7/2014 | Tantos | H03M 13/356 345/8 |

* cited by examiner

SYSTEMS AND METHODS FOR DELIVERING IMAGERY TO HEAD-WORN DISPLAY SYSTEMS

BACKGROUND

Inventive concepts of the present disclosure relate generally to the field of head-worn display systems. More particularly, the inventive concepts of the present disclosure relate to processing and transmitting imagery for display on a head-worn display system using a processing circuit located remotely from the head-worn display system.

Head-worn display systems may be used by a pilot of a vehicle (e.g., an aircraft) to display information relating to the operation of the vehicle. For example, a head-worn display for a pilot (e.g., a display mounted to a helmet worn by the pilot) may augment the pilot's view by overlaying images or symbols to help the pilot identify objects or locations when looking out a window of the aircraft. In some instances, imagery projected on the display may be dynamically linked to the orientation of the pilot (e.g., the pilot's head orientation or eye orientation). In other words, the pilot may focus on a particular portion of the display corresponding with an outside target, and imagery on the display may be adjusted to highlight the target and the area around the target, though displayed imagery does not have to be dynamically linked to the orientation of an individual.

Head-worn display systems may receive imagery from circuitry located onboard an aircraft, for example, from one or more sensors and/or a vision system such as an enhanced vision system ("EVS"), synthetic vision system ("SVS"), or combined vision system ("CVS"). The imagery can be processed and transmitted to a head-worn display system, and then rendered on the display of the head-worn display system. However, current head-worn display systems require high-resolution imagery to provide sufficient details to the pilot. For example, imagery on current head-worn displays may be frequently refreshed as the pilot moves his or her head or eyes during operation, thereby requiring high levels of bandwidth to adequately display imagery on the head-worn display screen. Furthermore, current head-worn display systems typically display high resolution display imagery on the entire display of the head-worn display system, thereby requiring relatively large images to be frequently transmitted to the head-worn display system.

SUMMARY

In one aspect, the inventive concepts disclosed herein are directed to a method. The method includes receiving, by a processing circuit of a head-worn display system, imagery from one or more sensors configured to capture details of an environment surrounding an aircraft. The method further includes receiving, by the processing circuit, a current gaze of a user of the head-worn display. The method further includes processing, by the processing circuit, the imagery. The processing comprises identifying one or more attributes of the imagery. The method further includes identifying, by the processing circuit, at least two layers of the imagery. At least one of the at least two layers has a different resolution than another layer. The method further includes determining, by the processing circuit, a priority of each of the at least two layers based on the one or more attributes and the current gaze of the user. The method further includes transmitting, by an output circuit of the head-worn display system, one or more of the at least two layers to the head-worn display based on the determined priority of the layers.

In a further aspect, the inventive concepts disclosed herein are directed to an image delivery system for a head-worn display. The system includes an input module, an image processing module, a prioritization module, an output module, and a processor. The input module is coupled to the processor and configured to cause the processor to receive a current gaze of a user of the head-worn display and imagery from one or more sensors configured to capture details of an environment surrounding an aircraft. The image processing module is coupled to the processor and is configured to cause the processor to process the imagery. Processing the imagery comprises identifying one or more attributes of the imagery and identifying at least two layers of the imagery. At least one of the at least two layers has a different resolution than another layer. The prioritization module is coupled to the processor and is configured to cause the processor to determine a priority of each of the at least two layers based on the one or more attributes and the current gaze user. The output module is coupled to the processor and is configured to cause the processor to transmit one or more of the at least two layers to the head-worn display based on the determined priority of the layers. The input module, the processor, the image processing module, the prioritization module, and the output module are each remote from the head-worn display.

In a further aspect, the inventive concepts disclosed herein are directed to a system. The system includes a vision system and an image delivery system. The vision system is configured to generate an image of an environment surrounding an aircraft. The vision system receives inputs from a plurality of sensors of the aircraft. The image delivery system is configured to process the image generated by the vision system to identify one or more attributes of the image. The image delivery system is further configured to identify at least two layers of the image. At least one of the at least two layers has a different resolution than another layer. The image delivery system is further configured to determine a priority of each of the at least two layers based on the one or more attributes and the current gaze of the user. The image delivery system is further configured to transmit one or more of the at least two layers to a head-worn display based on the determined priority of the layers.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
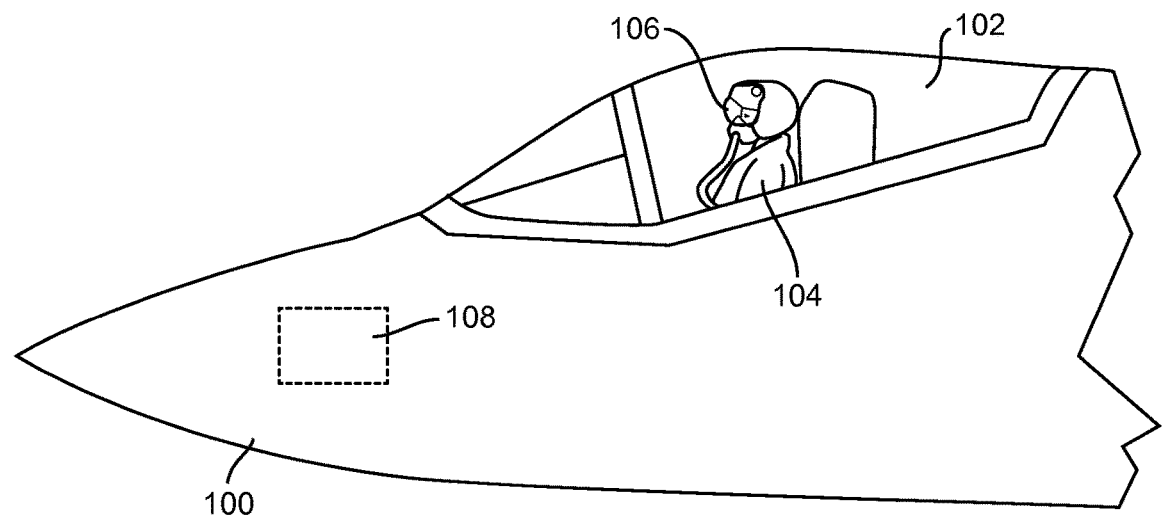
FIG. 1 is a schematic illustration of an exemplary embodiment of a nose portion of an aircraft having a cockpit occupied by a pilot wearing a head-worn display according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for providing imagery for display on a head-worn display system. The inventive concepts disclosed herein can be utilized in a number of control systems for various types of applications, sensing systems, and display systems. While the present disclosure describes systems and methods implementable for a head-worn display for a pilot of an aircraft, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles or and objects.

Referring generally to the figures, systems and methods for providing imagery for display on a head-worn display system are shown and described according to the inventive concepts disclosed herein. A pilot or operator of an aircraft or other vehicle may use a head-worn display system (e.g., mounted on a helmet of the pilot) to receive information relating to the operation of the aircraft (e.g., by having imagery and symbols displayed in the field of view of the pilot). The display may be updated dynamically based on the current status of the aircraft and a gaze of the pilot (e.g., based on the orientation of the head, eyes, or body part of the pilot). However, as described above, constantly transmitting detailed imagery to be displayed on the head-worn display system may be challenging.

In some embodiments, the systems and methods described herein are configured to transmit imagery to the head-worn display system by first identifying and transmitting imagery that would be most perceptually sensitive to the user. For example, an image delivery system may receive an input from one or more sensors and one or more vision systems (e.g., an EVS, SVS, or CVS). The input may relate to actual or generated imagery to be displayed on the head-worn display. The image delivery system first transmits a low-resolution image to be displayed, then one or more higher-resolution images or layers. The image delivery system may identify portions of the input that are most relevant to the user, generate a detailed image for the relevant portions, and transmit these portions first to the head-worn display system. For example, the image delivery system may identify a region of interest on the display (e.g., a portion of the display in the field of view of a pilot, and a portion of the display in the peripheral view of a pilot). The image delivery system may then deliver detailed imagery for the field of view of the pilot, followed by additional imagery in the peripheral view of the pilot at a later time. Delivering the detailed imagery for the field of view of the pilot before delivering any additional information enables the image delivery system to quickly deliver the most relevant imagery to the pilot while delivering less critical imagery later, thereby reducing bandwidth requirements for transmitting imagery relevant to the pilot. In various embodiments, as described herein, the image delivery system may divide the input into a plurality of layers, with at least one layer, or each layer, having a different resolution. The image delivery system can prioritize the layers for transmission to the head-worn display, thereby enabling the head-worn display to receive high-resolution imagery for the most important areas of the display. In some embodiments, the most important areas of the display screen (e.g., a center area of the display screen) may also be updated more frequently than other areas of the display screen (e.g., a peripheral area of the display screen).

A pilot may generally be insensitive to low spatial frequency and low temporal frequency changes in the display of the head-worn display (e.g., changes outside of the direct field of view of the pilot). The inventive concepts described herein may be used to deliver new or updated imagery to the display based on this effect. Low spatial frequency luminance and color information for new or updated imagery may be initially ignored, while high spatial frequency edges are prioritized and transmitted to the display (e.g., in real-time). High spatial frequency content may be superimposed onto older low spatial frequency content displayed on the display, thereby providing the impression of up to date content on the display. Over time, intermediate and low spatial frequency content is transmitted to the display to provide further details of the imagery.

Referring to FIG. 1, a schematic illustration of a nose portion of an aircraft 100 having a cockpit 102 occupied by a pilot 104 wearing a head-worn display 106 is shown according to the inventive concepts disclosed herein. The pilot 104 uses the head-worn display 106 to receive and view information related to the operation of the aircraft 100. The head-worn display 106 receives the information from an image delivery system 108 located remotely from the head-worn display 106. The image delivery system 108 may be a system located within the aircraft 100 configured to receive an input from one or more sensors or vision systems of the aircraft 100. The image delivery system 108 may process the inputs and provide the head-worn display 106 with imagery (e.g., images, symbols, and other display information or features), as described with reference to FIGS. 3 and 4. The head-worn display 106 may be configured to provide imagery in any type of format. The head-worn display 106 may be configured to provide two-dimensional or three-dimensional imagery. The type of display used with the head-worn display 106 is in no way limited.

The head-worn display 106 may receive images processed by an image processing circuit located remote from the head-worn display 106. The image processing circuit may receive inputs from the sensors and vision systems of the aircraft 100. For example, in some embodiments, the image delivery system 108 receives inputs from a sensor of the aircraft 100 and processes the inputs before communicating processed images to the head-worn display 106. In some embodiments, the head-worn display 106 requires fewer components to display images when image inputs are processed remote from the head-worn display 106 (e.g., at the image delivery system 108) and then delivered to the head-worn display 106 instead of processing the image inputs with equipment on the head-worn display 106 itself. Such arrangements minimize hardware components required by the head-worn display 106 and may further reduce the electric power and computational power needed to operate the head-worn display 106. In some embodiments, the head-worn display 106 may be configured to receive imagery from the image delivery system 108 and to render the imagery on the display without further processing the imagery, while in other embodiments the head-worn display may be configured to further process the received imagery before the imagery is displayed.

Figure 2:
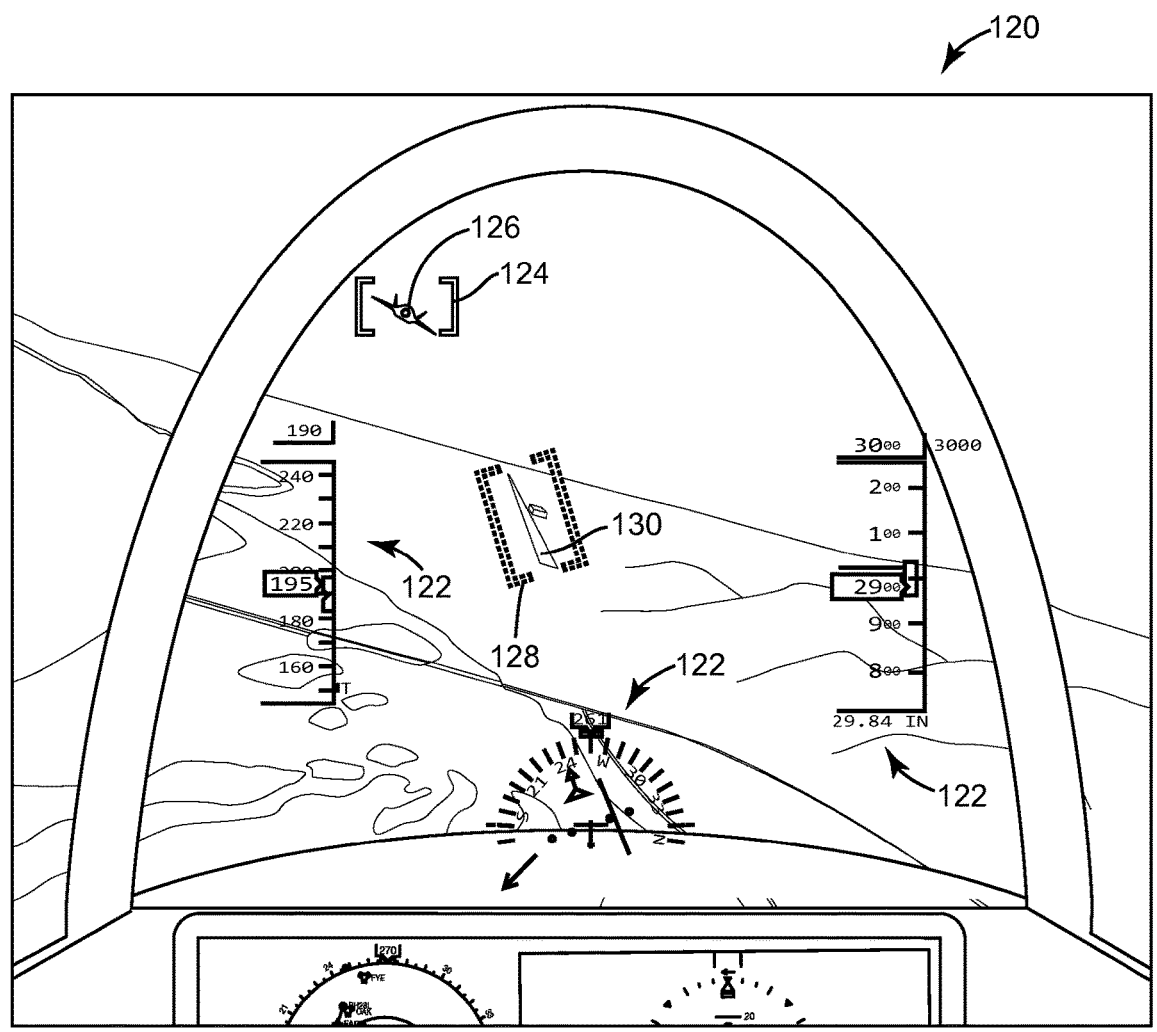
FIG. 2 is an exemplary viewpoint of the pilot through the head-worn display of FIG. 1.

Referring to FIG. 2, a perspective view of an example viewpoint 120 of the pilot 104 through the head-worn display 106 is shown according to the inventive concepts disclosed herein. The display screen of the head-worn display 106 may be fully transparent or semi-transparent to enable the pilot 104 to view a scene along with display information. In one embodiment, the display information includes screen-referenced imagery 122. For example, the screen-referenced imagery 122 may include information relating to the aircraft's position, speed, altitude, and heading, weather information, or any other information displayed in a fixed position on the display screen. The display information may include aircraft-referenced imagery 124 (e.g., a target indicator for a weapons system that indicates the position of a target 126 with reference to the aircraft 100). The display information may include earth-referenced imagery 128 (e.g., objects of interest based on the object's known location on earth, such as a runway 130).

Figure 3:
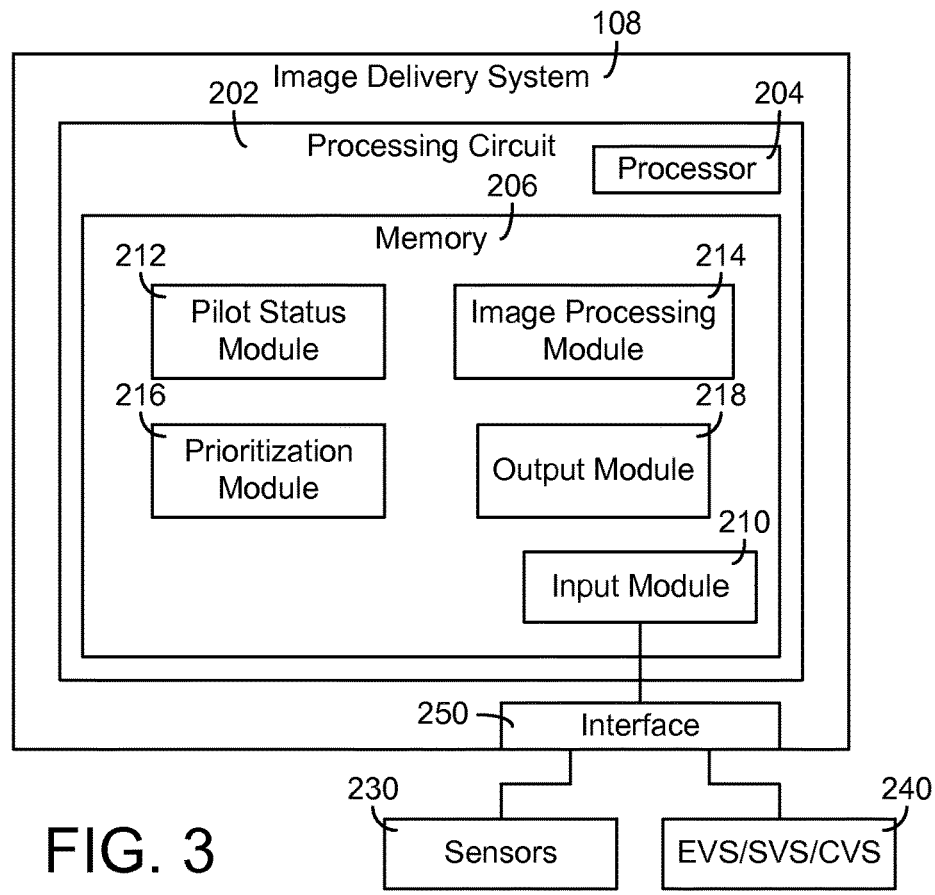
FIG. 3 is a block diagram of an exemplary embodiment of an image delivery system configured to generate a display for the head-worn display of FIG. 1.

Referring now to FIG. 3, a block diagram of an exemplary embodiment of the image delivery system 108 is shown according to the inventive concepts disclosed herein. The image delivery system 108 includes a processing circuit 202 and an interface 250. The processing circuit 202 includes a processing circuit or processor 204 and a memory 206. The memory 206 includes a pilot gaze module 212, an image processing module 214, a prioritization module 216, an output module 218, and an input module 210. The interface 250 is configured to communicate with sensors 230 and a vision system 240 (e.g., such as an EVS/SVS/CVS).

As described above, the image delivery system 108 is generally configured to transmit imagery to be displayed on the head-worn display 106. The image delivery system 108 receives input from one or more sensors or vision systems of the aircraft 100, identifies imagery relevant to the field of view of the pilot 104 from the input, and transmits the relevant imagery to the head-worn display 106. For example, the image delivery system 108 may first transmit high-resolution imagery most relevant to the field of view of the pilot 104, followed by other lower-resolution imagery comprising the peripheral view of the pilot 104.

The image delivery system 108 is configured to receive an input from one or more systems configured to generate imagery for display on a head-worn display 106 or another display system of the aircraft 100. The imagery may relate to an external area around the aircraft 100 relevant to operation of the aircraft 100 (e.g., the area shown as an example in the display of FIG. 2). The image delivery system 108 may receive input from one or more sensors 230 configured to capture images, and from one or more vision systems 240 (e.g., an EVS, CVS, SVS) configured to generate imagery that enables a viewer to identify objects and areas of interest. The image delivery system 108 may receive input from any aircraft system used to generate imagery for output to the head-worn display 106. The image delivery system 108 may include an interface 250 configured to receive input from the various systems and sensors either via a wired or wireless connection. While the process of generating imagery of an area external to the aircraft 100 is described as occurring at the sensors 230 and the vision system 240, the image delivery system 108 may at least partially generate the imagery. The image delivery system 108 may be configured to combine the various inputs from the various systems to generate imagery representing an actual view, a synthetic view, or a combination view.

Once imagery is received by the image delivery system 108, the processor 204 processes the imagery and portions of the imagery are transmitted to the head-worn display 106 in an efficient manner. The processor 204 may be implemented as a specific purpose processor, an application specific integrated circuit (ASIC), one or more field programmable gate arrays (FPGAs), a group of processing components, or other suitable electronic processing components. The memory 206 is one or more devices (e.g., RAM, ROM, flash memory, hard disk storage) for storing data and computer code for completing and facilitating the various user or client processes, layers, and modules described in the present disclosure. The memory 206 may be or include volatile memory or non-volatile memory and may include database components, object code components, script components, or any other type of information structure for supporting the various activities and information structures of the inventive concepts disclosed herein. The memory 206 is communicably connected to the processor 204 and includes computer code or instruction modules for executing one or more processes described herein.

The memory 206 includes various modules that cause the processor 204 to execute the systems and methods described herein. The memory 206 includes an input module 210 configured to cause the image delivery system 108 to receive imagery from the various sensors 230 and the vision systems 240 via the interface 250. The imagery may include details of an environment surrounding the aircraft 100. The input module 210 may be configured to cause the image delivery system 108 to combine, separate, and modify the received imagery for processing by the processor 204 as described further below.

The pilot gaze module 212 is configured to cause the processor 204 to determine a current gaze of the pilot 104 wearing a head-worn display 106 in the aircraft 100. The gaze of the pilot 104 may be based on a combination of the eye and head orientation of the pilot 104. The pilot gaze module 212 causes the processor 204 to determine a field of vision of the pilot 104 and a peripheral field of vision of the pilot 104 based on the gaze of the pilot 104. For example, the pilot gaze module 212 causes the processor 204 to determine a main field of view of the pilot 104 based on a direction that the eyes of the pilot 104 are pointed. The pilot gaze module 212 may be further configured to cause the processor 204 to determine a portion of the display screen of the head-worn display 106 that corresponds with the main field of view as well as an area proximate the main field of view of the pilot 104 (e.g., a peripheral view of the pilot). For example, the peripheral view of the pilot may be an area visible to the pilot but for which certain details of the imagery cannot be fully ascertained by the pilot 104 (e.g., an area ranging between about 18 to 110 degrees from the center of the pilot's eye). The head-worn display 106 and other aircraft systems may be configured to track the movement of the pilot 104 and portions of the pilot 104 (e.g., the pilot's head, eyes, neck, torso) during operation of the aircraft 100 to determine an orientation of the pilot 104 and the gaze direction of the eyes of the pilot 104. For example, the head-worn display 106 may include a gyroscope configured to determine the orientation of the head of the pilot 104. As another example, the head-worn display 106 may include an eye tracking system configured to determine the orientation of the eyes of the pilot 104.

In some embodiments, the pilot gaze module 212 causes the processor 204 to track movement of the pilot 104 over time. For example, the pilot gaze module 212 may be configured to cause the processor 204 to determine when the pilot 104 has shifted his or her eyes from a first portion of the display of the head-worn display 106 to look at a different portion of the display. As another example, the pilot gaze module 212 may be configured to cause the processor 204 to determine if the head of the pilot 104 has moved from a first position to a second position. The pilot gaze module 212 may be configured to cause the processor 204 to determine a new or updated field of view and peripheral field of view of the pilot 104 based on a change in the pilot's gaze. The processor 204 is configured to update the imagery shown on the head-worn display 106 based on the pilot's gaze changing as described below.

In some embodiments, the memory 206 does not include the pilot gaze module 212. In such embodiments, the image delivery system 108 may be configured to receive pilot gaze information and other related information from another system of the aircraft 100. The image delivery system 108 may be configured to receive information regarding the gaze of the pilot 104 from any aircraft system configured to track the bodily orientation or eye movement of the pilot 104 of the aircraft 100. In some embodiments, the image delivery system 108 provides imagery for the head-worn display 106 based on general display properties of the head-worn display 106. For example, the image delivery system 108 may provide more detailed imagery for the center of the display and less detailed imagery for the edges of the display of the head-worn display 106.

The image processing module 214 is configured to cause the processor 204 to process imagery received by the image delivery system 108. The image processing module 214 may be configured to cause the processor 204 to identify or generate one or more layers of the imagery and identify one or more attributes (e.g., objects, points of interest, etc.) of the imagery. For example, the image delivery system 108 receives imagery, the processor 204 processes the imagery to prepare the imagery for display on the head-worn display system 106, and the output module 218 causes the processor 204 to output the imagery to the head-worn display system 106.

The image processing module 214 is configured to cause the processor 204 to generate multiple layers for the imagery received, with each layer possibly having the same resolution or a different resolution than other layers. For example, for a particular image received by the image delivery system 108, the image processing module 214 causes the processor 204 to divide the image into multiple layers with each layer having a different resolution. The image delivery system 108 then transmits one or more of the layers to the head-worn display 106 to be displayed. In some embodiments, the layers are transmitted such that a lower-resolution layer is transmitted for display on the head-worn display 106 to populate the display, while only a portion of the higher-resolution layer corresponding to a field of view of the pilot is transmitted. By first transmitting the lower-resolution image to the head-worn display 106 before transmitting the higher-resolution image for particular areas of the head-worn display screen, the bandwidth required to transmit the images to the head-worn display 106 is reduced.

The image processing module 214 is configured to cause the processor 204 to generate a multi-resolution representation of the imagery received at the image delivery system 108. In various embodiments, the image processing module 214 causes the processor 204 to generate any number of layers representing different characteristics of the imagery. As an example, in some embodiments, the processor 204 may generate nine layers (e.g., layer 0 through layer 8). After the processor 204 generates the layers, the image delivery system 108 transmits the layers accordingly to a schedule or pattern based on the resolution or level of visual detail of each layer. For example, a layer having a highest resolution (e.g., layer 8) may be transmitted to the head-worn display 106 every 1 millisecond, while a layer having a lowest resolution (e.g., layer 0) may be transmitted every 50 milliseconds. The image delivery system 108 may be configured to transmit high-resolution layers containing the most relevant detail for the pilot 104 more often than lower resolution images containing less relevant details. The output module 218 may be configured to cause the processor 204 to determine which layers need to be refreshed more often than others and which layers can be transmitted less often. In some embodiments, the output module 218 is configured to cause the image delivery system 108 to transmit only a portion of the higher resolution layers to the head-worn display system 106. In some embodiments, the image delivery system 108 transmits layers based on a predetermined schedule or order (i.e., the layers are not necessarily transmitted based on an increasing or decreasing order of resolution of each layer). For example, a first layer may be transmitted to the head-worn display before a second layer based on the first layer containing information most relevant during the aircraft 100 being in a cruising phase of flight, while the second layer may be transmitted to the head-worn display before the first layer when the aircraft 100 is in a takeoff phase of flight. In some embodiments, a refresh rate may be associated with one or more layers that defines how often updated imagery is transmitted to the head-worn display system 106 for the one or more layers.

In one embodiment, the image processing module 214 causes the processor 204 to generate downsample the imagery when creating a layer (e.g., each layer is downsampled by a factor of two). For example, the processor 204 may be configured to downsample the imagery such that a highest resolution layer (e.g., layer 8) is a 512 by 512 pixel image, and a high resolution layer (e.g., layer 7) is a 256 by 256 pixel image. In such an example, each smaller layer requires one-fourth of the bandwidth of the previous layer during transmission of the layer to the head-worn display (e.g., a 256 by 256 pixel image requires one-fourth the bandwidth that a 512 by 512 pixel image requires). In some embodiments, the resolution difference between each layer varies by a fixed or random amount.

Each layer of the imagery may have different properties, depict different imagery, or differ in other various ways. For example, details of various objects or attributes identified within the imagery may be varied based on a resolution level of each layer. The detail of various shapes or objects may increase as the resolution of the layer increases. For example, a tower may be identified as an attribute in an image, and for each layer the detail of the tower (e.g., the outline of the tower, color of the tower, symbology highlighting the tower) is varied based on the resolution of the layer. According to other examples, different colors or color schemes may be used in different layers (e.g., a grayscale or monochrome color scheme for low resolution layers and an infrared color scheme for high resolution layers), different symbols, icons, or markers may be used for different layers (e.g., more detailed icons for more detailed layers), and different representations for numeric values (e.g., generated by the SVS) may be used for different layers of the imagery.

The image delivery system 108 may use various methods and processes to generate the multiple layers having different resolutions. In one embodiment, a dynamic range optimization display system may be used for low resolution images that still provide detailed imagery of high detail areas in the imagery while providing less details for low detail areas of the imagery. For example, for a given image received at the image delivery system 108, the image may be sampled every so many pixels instead of at equally-spaced increments of intensity. For an image with only a small portion of high intensity imagery and large portions of low intensity imagery, the high intensity region and low intensity region are not sampled at the same rate. The high intensity region may be sampled at a higher rate, thereby resulting in more detailed imagery. The image processing module 214 may be configured to create a high resolution image using the dynamic range optimization display system while generating lower resolution images by sampling equally-spaced increments of intensity. According to various embodiments, any type of image processing method may be used by the image delivery system 108 to generate any given layer of the imagery.

In some embodiments, only a portion of a higher resolution layer is transmitted to the head-worn display 106. The transmitted portion may be a portion corresponding with the field of view of the pilot 104 that provides the pilot 104 with high-resolution imagery in his or her field of view while, at the same time, providing less detailed imagery to the pilot 104 outside the main field of view of the pilot 104 (e.g., in an area of the display corresponding to a peripheral view area of the pilot). The prioritization module 216 may be configured to cause the processor 204 to determine which imagery to transmit to the head-worn display 106 based on the resolution of the imagery and the current field of view of the pilot 104.

In some embodiments, the prioritization module 216 is configured to cause the processor 204 to identify portions of the imagery to transmit first to the head-worn display 106 before other portions of the imagery are transmitted to the head-worn display 106. For example, the prioritization module 216 may be configured to cause the processor 204 to identify imagery in a high-resolution layer to be displayed in the center of the display screen of the head-worn display 106 based on the gaze of the pilot 104 extending through the center of the display screen of the head-worn display 106. For example, the higher resolution imagery may be provided in the field of view of the pilot 104. In some embodiments, the prioritization module is configured to cause the processor 204 to identify imagery in a high-resolution layer to be displayed in the center of the display screen of the head-worn display 106 regardless of where the gaze of the pilot 104 is directed. The prioritization module 216 may cause the processor 204 to determine the field of view and peripheral view of the pilot 104 based on a the current gaze of the pilot 104. The imagery may be transmitted to the head-worn display 106 first before any other imagery is transmitted to the head-worn display 106 so that the pilot 104 is provided with imagery on an area of the display that corresponds with the current gaze of the pilot 104. Imagery having a lower resolution may be provided in other areas of the display to "fill out" the entire display so that the pilot 104 is provided with context for viewing the imagery displayed in high resolution. For example, a low resolution layer may be transmitted to the display for the entire display screen while a high resolution layer is transmitted to the display for only the portion of the display corresponding to the current gaze of the pilot 104. The head-worn display 106 is configured to receive and render the layers on the display for viewing by the pilot 104.

In some embodiments, the prioritization module 216 causes the processor 204 to identify a central area of the display that the pilot 104 is most likely looking at based only on the bodily orientation of the pilot 104. For example, if the image delivery system 108 is not configured to track the eyes of the pilot 104, the processor 204 may rely on the body position of the pilot to determine the pilot's gaze. The orientation of the pilot's body may be based on the position of the head, neck, torso, or other body portion of the pilot 104. The prioritization module 216 may be further configured to cause the processor 204 to determine a range proximate the central area (e.g., 10 degrees, 15 degrees, 20 degrees) that covers the likely field of view of the pilot 104 to identify high-resolution imagery in one or more layers corresponding with the determined range. For example, the prioritization module 216 may be configured to cause the processor 204 to identify a location in the display and to provide the head-worn display 106 with high-resolution imagery for the area proximate the display. The prioritization module 216 may be configured to cause the processor 204 to identify the area of the display the pilot 104 is looking through based on the gaze of the pilot 104. For example, the processor 204 may determine the range proximate the central area of the pilot's view based on the gaze of the pilot 104.

In some embodiments, the prioritization module 216 causes the processor 204 to determine which high-resolution imagery to transmit to the head-worn display 106 based on an aircraft status. For example, if the aircraft 100 is in the process of descending or landing, the prioritization module 216 may cause the processor 204 to prioritize imagery corresponding with a runway or landing strip and to transmit the highest resolution imagery of the runway or landing strip to the head-worn display 106. Similarly, if the aircraft 100 is taking off, the prioritization module 216 may cause the processor 204 to prioritize imagery critical to the takeoff process and transmit the prioritized imagery to the head-worn display 106.

In some embodiments, the prioritization module 216 is configured to cause the processor to determine which imagery to transmit to the head-worn display 106 based on a refresh rate of one or more layers. For example, some imagery may be associated with a refresh rate, and the refresh rate may indicate when new or updated imagery should be transmitted to replace non-current imagery. In some embodiments, to provide accurate information to the pilot 104, high resolution imagery is refreshed more often than low resolution imagery (e.g., changes in imagery over time may be more pronounced in higher resolution imagery). The prioritization module 216 may be configured to cause the processor 204 to identify portions of a layer to be transmitted to refresh a current view in the field of view of the pilot 104. In some embodiments, the processor 204 permits imagery in the peripheral view of the pilot 104 to decay if the imagery remains out of the direct field of view of the pilot 104 for a particular time period.

The output module 218 is configured to cause the image delivery system 108 to transmit the imagery to the head-worn display 106. In some embodiments, the output module 218 causes the image delivery system 108 to transmit the imagery via LiFi (Light Fidelity). In some embodiments, the output circuit 218 causes the image delivery system 108 to transmit the imagery via any other wireless or wired communication methodology.

In various embodiments, the processor 204 may account for one or more pilot preferences or aircraft preferences when processing the imagery for transmission. For example, a particular pilot may have a dominant eye, and the processor 204 may account for the dominant eye by causing the image delivery system 108 to transmit more detailed imagery in the field of view of the dominant eye. As another example, a pilot may have one or more display preferences saved or pre-loaded into the image delivery system 108 (e.g., the pilot may prefer detailed imagery for the entire display regardless of his or her orientation, or the pilot may prefer not to view detailed imagery outside of his or her field of view). The pilot 104 may input their preferences into the image delivery system 108 or participate in a calibration process to have the processor 204 assist in determining the display preferences of the pilot 104. As yet another example, the image delivery system 108 may be configured to track a behavior of the pilot 104 over time and adjust the transmitted imagery to correspond with the behavior of the pilot 104. As yet another example, an airline or aircraft preference may be saved or pre-loaded into the image delivery system 108, which may be used to adjust the transmitted imagery for the pilot 104.

Figure 4:
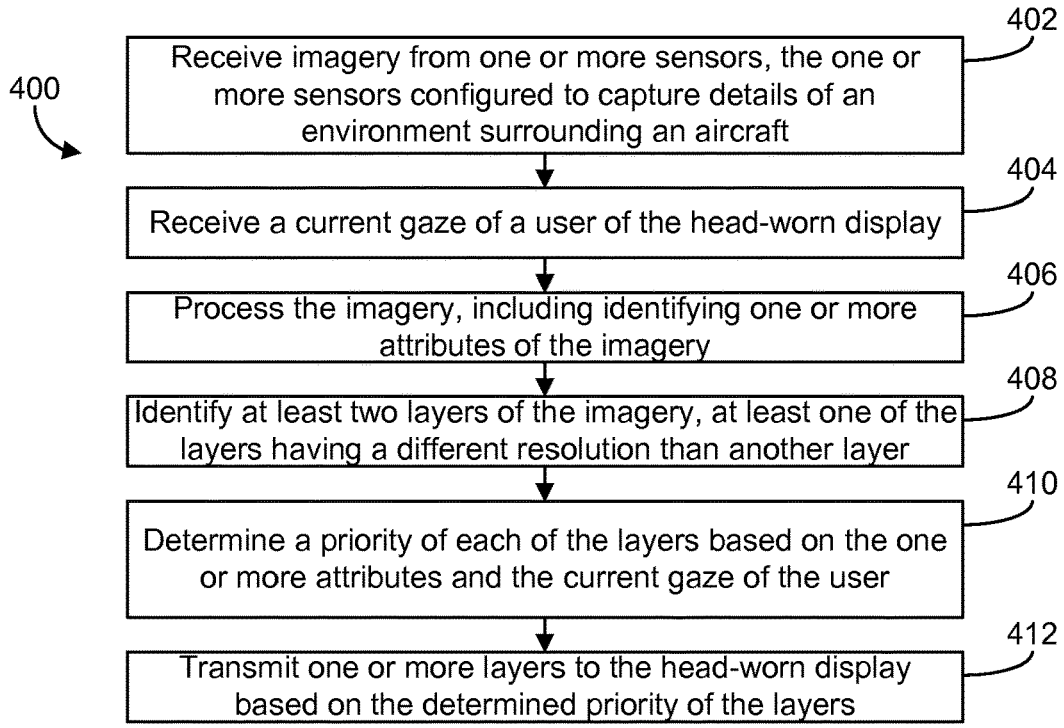
FIG. 4 is a flow chart of an exemplary embodiment of a process for generating a display on a head-worn display according to the inventive concepts disclosed herein.

Referring now to FIG. 4, a flow chart of an exemplary embodiment of a process 400 for generating a display on a head-worn display according to the inventive concepts disclosed herein. The process 400 may be executed by, for example, the processor 204 of the image delivery system 108 and may include one or more of the following steps. A step (402) may include receiving imagery from one or more sensors. The one or more sensors are configured to capture details of an environment surrounding an aircraft. The sensors may include any type of sensor or system (e.g., an EVS, SVS, or CVS as described above).

A step (404) may include receiving a current gaze of a user of the head-worn display. For example, step 404 may include determining an orientation of the user of the head-worn display. The orientation of the user may include the position of the head and body of the user, indicating the gaze and potential field of view of the user. The orientation of the user may further include the orientation of the eyes of the user. Step 404 may further include determining a precise field of view of the user. In other embodiments, step 404 may not include any eye tracking activity, and a field of view of the user may be predicted based on the orientation of the body and head of the user. In other embodiments, the image delivery system does not receive user orientation information in step 404, and may instead define the center of the display of the head-worn display as being in the field of view of the user.

Step 404 may further include receiving a status of the aircraft or aircraft system that impacts which types of imagery is displayed on the head-worn display. For example, if the aircraft is taking off or landing, the type of imagery displayed on the head-worn display may be different than if the aircraft is in a cruising phase mid-flight.

A step (406) may include processing the imagery, which includes identifying one or more attributes of the imagery. For example, processing the imagery may include identifying one or more objects or points of interest (e.g., a tower, a runway, a target, or any other external object that may impact the operation of the aircraft). As another example, step 406 may include identifying the ground and sky, and any features on the ground or in the sky that may impact the operation of the aircraft (e.g., a weather condition, other aircraft).

A step (408) may include identifying one or more layers of the imagery. Each layer may have a different resolution. For example, step 408 includes generating (or receiving) multiple layers where each layer is representative of the received imagery. A step (410) may include determining a priority of the layers and portions of each layer based on the one or more attributes and the current gaze of the user.

In some embodiments, as described in step 404, the current gaze of the user includes a field of view and peripheral view of the user. Step 410 may include identifying a region in a higher-resolution layer corresponding with the field of view of the user. The region may be transmitted to the head-worn display at step 412 to provide detailed imagery to the display for viewing by the user. A lower resolution layer may also be transmitted to the head-worn display to provide imagery in the peripheral view of the user. Step 410 may include prioritizing the layers by identifying one or more lower resolution layers and one or more portions of one or more higher resolution layers to transmit to the head-worn display, and identifying the order in which to transmit the layers to the display. In some embodiments, step 410 includes identifying a phase of flight of the aircraft (e.g., landing, taking off, mid-flight) and prioritizing layers based on the phase of flight (e.g., prioritizing a portion of a layer that includes a runway during a landing phase).

A step (412) may include transmitting one or more layers to the head-worn display based on the determined priority of the layers. For example, a first low-resolution layer of an image may be transmitted to fill out the entire display screen of the head-worn display. Then, one or more second layers including one or images having a higher resolution are transmitted to the head-worn display. The one or more second layers include images for display on only a portion of the head-worn display. In one embodiment, the higher resolution imagery is provided in the center of the display. In another embodiment, the higher resolution imagery is provided in the field of view of the user outside the center of the display. For example, if the processor 402 determines that a particular feature of an image does not have a high priority, the processor 402 can cause the feature to be displayed in a low resolution. If the processor 402 determines that a particular feature of the an image has a high priority, the processor 402 can cause most of the image to be displayed in a low resolution while causing the feature having a high priority to be displayed in a higher resolution than the rest of the image.

In some embodiments, a refresh rate may be associated with one or more of the layers transmitted to the head-worn display. The refresh rate may indicate how often to a layer should be transmitted to the head-worn display to update the imagery being displayed. Step 412 may further include transmitting one or more layers based on the refresh rate of each layer.

In some embodiments, step 404 includes receiving updated eye tracking information or head orientation information. For example, the field of view of the user may change when the user moves his or her head or eyes. Based on the field of view of the user changing, steps 406-412 may be executed to provide a new or updated field of view to the head-worn display based on the new field of view of the user.

As will be appreciated from the above, systems and methods for providing imagery for display on a head-worn display system according to embodiments of the inventive concepts disclosed herein may reduce electric power and computational power needed to operate typical head-worn display devices by processing imagery remote from head-worn display device and delivering only certain portions of the imagery needed by a wearer of the head-worn display device thereby reducing hardware requirements of the head-worn display device.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A method, comprising:
   receiving, by a processing circuit of a head-worn display system, imagery from one or more sensors configured to capture details of an environment surrounding an aircraft, wherein at least one of the one or more sensors is coupled with the aircraft;
   receiving, by the processing circuit, a current gaze of a user of the head-worn display;
   identifying, by the processing circuit, one or more attributes of the imagery;
   identifying, by the processing circuit, at least two layers of the imagery, wherein at least one of the at least two layers has a different resolution than another layer;
   determining, by the processing circuit, a priority of each of the at least two layers based on the one or more attributes, a phase of flight of the aircraft, and the current gaze of the user;
   transmitting, by an output circuit of the head-worn display system, a first layer of the at least two layers to the head-worn display based on the first layer comprising a lower resolution image to fill out an entire display screen of the head-worn display;
   transmitting, by the output circuit a second layer of the at least two layers to the head-worn display after the first layer has been transmitted to the head-worn display, the second layer comprising a high resolution image having a first priority and a first resolution that is higher than a second resolution of the lower resolution image; and
   transmitting, by the output circuit, a third layer of the at least two layers to the head-worn display after the second layer has been transmitted to the head-worn display, the third layer comprising an intermediate resolution image having a third resolution that is lower than the first resolution and higher than the second resolution and a second priority that is lower than the first priority.

2. The method of claim 1, wherein the current gaze of the user comprises a field of view and a peripheral view of the user;
   wherein the second layer comprises at least one of a portion of a region nearest to a focal point of the current gaze of the user and a portion of the region corresponding to the field of view of the user; and
   wherein the second layer is transmitted to the head-worn display at a higher rate than the first layer.

3. The method of claim 1, wherein the current gaze of the user comprises a field of view and a peripheral view of the user; and
   wherein the first layer comprises a portion of the region corresponding to the peripheral view of the user.

4. The method of claim 2, wherein the current gaze of the user is based on eye tracking information and an orientation of the head-worn display; and
   wherein the eye tracking information is used to determine the field of view and the peripheral view of the user.

5. The method of claim 4, further comprising:
   receiving, by the processing circuit, updated eye tracking information;

identifying, by the processing circuit, an updated field of view of the user; and transmitting, by the output circuit, the first layer and the second layer corresponding to the updated field of view of the user to the head-worn display.

6. The method of claim 4, wherein determining the field of view of the user comprises:
determining a current head orientation of the user;
determining a focal area of the display based on the current head orientation; and
determining a range proximate the focal area;
wherein the second layer comprises imagery within the range proximate the focal area.

7. The method of claim 1, wherein the one or more attributes identified in each layer comprises one or more of a tower, a runway, a ground, a sky, and an obstacle; and
wherein determining the priority of each of the at least two layers includes prioritizing the one or more attributes such that imagery having the highest resolution is transmitted to the head-worn display.

8. The method of claim 1, wherein determining the priority of each of the at least two layers is further based on a setting inputted by the user of the head-worn display.

9. The method of claim 1, wherein the phase of flight of the aircraft is a landing phase, and wherein the second layer is related to a runway.

10. The method of claim 1, wherein the processing circuit is further configured to assign a refresh rate to each of the at least two layers, the method further comprising:
receiving, by the processing circuit, updated imagery from the one or more sensors after receiving and processing the imagery;
identifying, by the processing circuit, one or more layers of the updated imagery; and
transmitting, by the output circuit, based on the refresh rate of layers previously transmitted to the head-worn display, one or more layers of the updated imagery to the head-worn display to replace one or more of the previously transmitted layers.

11. An image delivery system for a head-worn display, comprising:
an input module coupled to a processor of an image delivery system and configured to cause the processor to receive a current gaze of a user of the head-worn display and imagery from one or more sensors configured to capture details of an environment surrounding an aircraft, wherein at least one of the one or more sensors is coupled with the aircraft;
an image processing module coupled to the processor and configured to cause the processor to identify one or more attributes of the imagery and identify at least two layers of the imagery, wherein at least one of the at least two layers has a different resolution than another layer;
a prioritization module coupled to the processor and configured to cause the processor to determine a priority of each of the at least two layers based on the one or more attributes, a phase of flight of the aircraft, and the current gaze of the user; and
an output module coupled to the processor and configured to cause the processor to:
transmit a first layer of the at least two layers to the head-worn display based on the first layer comprising a lower resolution image to fill out an entire display screen of the head-worn display;
transmit a second layer of the at least two layers to the head-worn display after the first layer has been transmitted to the head-worn display, the second layer comprising a high resolution image having a first priority and a first resolution that is higher than a second resolution of the lower resolution image; and
transmit a third layer of the at least two layers to the head-worn display after the second layer has been transmitted to the head-worn display, the third layer comprising an intermediate resolution image having a third resolution that is lower than the first resolution and higher than the second resolution and a second priority that is lower than the first priority;
wherein the input module, the processor, the image processing module, the prioritization module, and the output module are each remote from the head-worn display.

12. The system of claim 11, wherein the current gaze of the user comprises a field of view and a peripheral view of the user;
wherein the second layer comprises at least one of a portion of the region nearest to a focal point of the current gaze of the user and a portion of the region corresponding to the field of view of the user; and
wherein the second layer is transmitted to the head-worn display at a higher rate than the first layer.

13. The system of claim 11, wherein the current status gaze of the user comprises a field of view and a peripheral view of the user, and wherein the first layer comprises a portion of the region corresponding to the peripheral view of the user.

14. The method of claim 13, wherein the current gaze of the user is based on eye tracking information and an orientation of the head-worn display; and
wherein the eye tracking information is used to determine the field of view and the peripheral view of the user.

15. The system of claim 14, wherein the input module is further configured to cause the processor to receive updated eye tracking information, and wherein the image processing module is further configured to cause the processor to identify an updated field of view of the user; and
wherein the first layer and the second layer of the at least two layers are transmitted to the head-worn display based on the one or more layers corresponding to the updated field of view of the user.

16. The system of claim 14, wherein determining the field of view of the user comprises:
determining a current head orientation of the user;
determining a focal area of the display based on the current head orientation; and
determining a range proximate the focal area;
wherein the second layer comprises imagery within the range proximate the focal area.

17. The system of claim 11, wherein the one or more attributes identified in each layer comprises one or more of a tower, a runway, a ground, a sky, and an obstacle; and
wherein determining the priority of each of the at least two layers includes prioritizing the one or more attributes such that imagery having the highest resolution is transmitted to the head-worn display.

18. A system, comprising:
a vision system configured to generate an image of an environment surrounding an aircraft, wherein the vision system receives inputs from a plurality of sensors of the aircraft;

an image delivery system configured to:
  identify one or more attributes of the image;
  identify at least two layers of the image, wherein at least one of the at least two layers has a different resolution than another layer; and
  determine a priority of each of the at least two layers based on the one or more attributes, a phase of flight of the aircraft, and the current gaze of the user; and
  transmit a first layer of the at least two layers to the head-worn display based on the first layer comprising a lower resolution image to fill out an entire display screen of the head-worn display;
  transmit a second layer of the at least two layers to the head-worn display after the first layer has been transmitted to the head-worn display, the second layer comprising a high resolution image having a first priority and a first resolution that is higher than a second resolution of the lower resolution image; and
  transmit a third layer of the at least two layers to the head-worn display after the second layer has been transmitted to the head-worn display, the third layer comprising an intermediate resolution image having a third resolution that is lower than the first resolution and higher than the second resolution and a second priority that is lower than the first priority.

* * * * *